United States Patent [19]

Hadziomerovic et al.

[11] Patent Number: 4,569,046
[45] Date of Patent: Feb. 4, 1986

[54] METHOD OF, AND A TERMINAL FOR, TRANSMITTING BYTES TO A BUS

[75] Inventors: Faruk Hadziomerovic, Kanata; Andrew McGregor, Ottawa, both of Canada

[73] Assignee: Northern Telecom Limited, Montreal, Canada

[21] Appl. No.: 514,445

[22] Filed: Jul. 18, 1983

[51] Int. Cl.[4] .............................. H04J 3/02; H04J 3/12
[52] U.S. Cl. ........................................ 370/85; 370/89; 370/109; 370/110.1; 340/825.5
[58] Field of Search .................. 370/85, 89, 94, 110.1, 370/109, 29; 340/825.5, 825.51

[56] References Cited

U.S. PATENT DOCUMENTS

| 3,710,351 | 1/1973  | Nakamura .      |            |
|-----------|---------|-----------------|------------|
| 4,106,104 | 8/1978  | Nitta et al.    | 340/825.5  |
| 4,162,477 | 7/1979  | Munkberg        | 340/825.5  |
| 4,210,780 | 7/1980  | Hopkins et al.  | 370/85     |
| 4,227,178 | 9/1980  | Gergaud et al.  | 370/85     |
| 4,229,815 | 10/1980 | Cummiskey       | 370/85     |
| 4,251,880 | 2/1981  | Baugh et al.    | 370/94     |
| 4,281,380 | 7/1981  | Demasa et al.   | 370/94     |
| 4,320,502 | 3/1982  | de Veer         | 370/85     |
| 4,342,995 | 8/1982  | Shima           | 370/85     |
| 4,355,385 | 10/1982 | Hampshire et al.| 370/85     |
| 4,380,052 | 4/1983  | Shima           | 370/85     |
| 4,380,065 | 4/1983  | Hietle et al.   | 370/85     |
| 4,394,756 | 7/1983  | Canniff         | 370/110.1  |
| 4,434,421 | 2/1984  | Bauer et al.    | 340/825.51 |
| 4,445,116 | 4/1984  | Glow            | 370/89     |
| 4,463,351 | 7/1984  | Chiarottino     | 340/825.5  |
| 4,464,749 | 8/1984  | Ulug            | 370/94     |
| 4,488,218 | 12/1984 | Grimes          | 340/825.5  |

FOREIGN PATENT DOCUMENTS 832183  1/1970  Canada .

OTHER PUBLICATIONS

Article entitled, "ISDN Subscriber Loop Protocol", by S. Lacher et al., International Zurich Seminar on Digital Communications, Mar. 1982.

Primary Examiner—Douglas W. Olms
Assistant Examiner—Curtis Kuntz
Attorney, Agent, or Firm—R. John Haley

[57] ABSTRACT

A plurality of terminals, such as digital telephones, are connected to a serial data bus formed by a balanced two-wire line. Each terminal transmits bytes bit-serially with the magnitude bits first, in order of decreasing significance, then the sign bit, and finally an even parity bit to maintain the balance of the line, the "1" bits being transmitted with alternating polarity. The terminals operate simultaneously and in synchronism. If a terminal, during a "0" bit of a byte which it is transmitting, detects a "1" pulse on the bus from another terminal, then it gives up transmission for the remainder of that byte and receives the greater magnitude byte which prevails on the bus. Thus a single two-wire line can be used for digital transmission in both directions between arbitrary numbers of telephones.

22 Claims, 7 Drawing Figures

METHOD OF, AND A TERMINAL FOR, TRANSMITTING BYTES TO A BUS

This invention relates to a method of, and a terminal for, transmitting bytes on a bus.

It is known to transmit bytes bit-serially on a bus to which a plurality of terminals are connected. A problem with known arrangements, however, arises whenever two terminals simultaneously wish to transmit bytes. In such a situation, the terminals contend with one another for access to the bus, and this contention must be resolved in some manner, such as according the terminals different priorities and awarding the bus to the terminal having the highest priority.

In a case where the terminals comprise telephones producing digital signals, generally known as digital telephones, known schemes for resolving contention for the bus are subjectively disadvantageous. For example, if two digital telephone extensions are connected to the same bus, speech signals from only one of them can be carried by the bus at any instant. Determining which telephone is to be awarded the bus gives rise to difficulties and problems, and the results can be subjectively annoying.

Accordingly, an object of this invention is to provide a method of, and a terminal for, transmitting bytes on a bus, which enable disadvantages of known arrangements to be avoided or reduced, and which are particularly applicable to digital telephone arrangements.

According to one aspect of this invention there is provided a terminal for transmitting bytes on a bus, the terminal comprising: first means for providing bytes for transmission bit-serially with magnitude bits first, in order of decreasing significance, and any sign bit following the magnitude bits; second means for applying a signal to the bus in response to each serial bit having a first binary value; and third means for inhibiting the application of such signals to the bus by the second aeans, for the remainder of a byte, in response to such a signal occurring on the bus during a serial bit having a second binary value, whereby each byte is only transmitted to the bus if its magnitude is not less than that of any byte simultaneously on the bus.

The third means preferably comprises receiving means for receiving signals from the bus and producing a corresponding bit stream, means for comparing bits of the bit stream with serial bits provided by the first means, and means for inhibiting the second means for the remainder of a byte in response to a difference between the compared bits. The means for comparing bits can conveniently comprise an exclusive-OR 9ate.

The terminal preferably includes means, responsive to said bit stream and to the means for inhibiting the second means, for receiving from the bus bytes during which the second means has been inhibited. Thus the terminal can receive bytes from the bus as well as transmitting them thereto, whereby the bus can be used for transmitting bytes in both directions thereon. At the start of each byte, the terminal is set to transmit a byte, and if transmission of this byte is interrupted then the terminal is set to receive the greater magnitude byte which occurs on the bus.

The first means and the means for receiving bytes can together comprise shift register means, such as two shift registers for respectively supplying bits of a byte for the bus and receiving bits of a byte from the bus, and a coder-decoder, generally referred to as a codec. This is particularly convenient in the case that the terminal is a telephone.

Preferably the first means includes means for providing each byte for transmission with a final parity bit so that each byte has even parity. Conveniently the second means comprises means for applying a pulse to the bus in response to each serial bit which is a binary one, successive pulses having opposite polarities and the first pulse of each byte having a predetermined polarity.

According to another aspect this invention provides a method of transmitting bytes on a bus having terminals coupled thereto, comprising the steps of: synchronizing the terminals to transmit bytes simultaneously and in synchronism; and, in each terminal: providing bytes for transmission bit-serially with the bits in order of decreasing significance; applying pulses to the bus in response to serial bits of one binary value; detecting pulses on the bus during serial bits of another binary value; and inhibiting the application of said pulses for the remainder of the byte in response to such detection; whereby the most significant byte of the simultaneous bytes prevails on the bus.

The method preferably includes the step of, in each terminal, receiving from the bus each byte which has not been transmitted by that terminal.

Preferably the bus is a balanced line, the pulses are applied to the bus with alternating polarity, the first pulse of each byte from each terminal having the same polarity, and each byte includes a final, even parity, bit to maintain the balance of said line.

The invention also provides apparatus comprising a bus and at least two terminals coupled thereto for transmitting bytes thereon, each terminal comprising: first means for providing bytes for transmission bit-serially with magnitude bits first, in order of decreasing significane, and any sign bit following the magnitude bits; second means for applying a pulse to the bus in response to each serial bit which is a binary one; third means for inhibiting the application of pulses to the bus by the second means, for the remainder of a byte, in response to a pulse occurring on the bus during a serial bit which is a binary zero; and means for synchronizing the first means so that the terminals transmit bytes simultaneously and in synchronism; whereby only the greatest magnitude byte, of bytes for simultaneous transmission from a plurality of the terminals, is fully transmitted to the bus. At least one terminal is preferably a telephone.

Preferably each terminal further comprises receiving means, responsive to the third means, for receiving from the bus bytes which have not been transmitted by that terminal. In this case preferably the third means comprises means for enabling the second means and inhibiting the receiving means at the start of each byte, and for inhibiting the second means and enabling the receiving means in response to a pulse occurring on the bus during a binary zero serial bit provided by the first means.

Preferably the bus comprises a balanced two-wire line and the second means of each terminal applies pulses to the bus with alternating polarity. Preferably also, for each terminal, the first means includes means for providing each byte for transmission with a final parity bit so that each byte has even parity, and the second means is arranged to apply the first pulse of each byte to the bus with a predetermined polarity.

The invention will be further understood from the following description with reference to the accompanying drawings, in which:

FIG. 1 schematically illustrates an arrangement of terminals interconnected via a time compression multiplexed (TCM) bus;

FIG. 2 schematically illustrates an arrangement of terminals interconnected via a bidirectional bus;

Figure 1:
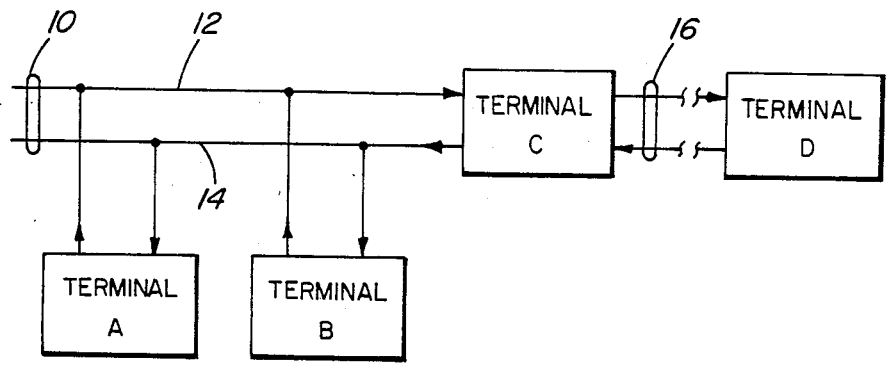

Referring to FIG. 1, two terminals A and B are each connected via a serial data bus 10 to a terminal C. The data bus 10 is a time compression multiplexed (TCM) bus having an upstream channel from the terminals A and B to the terminal C, and a downstream channel from the terminal C to the terminals A and B, denoted in FIG. 1 by lines 12 and 14 respectively. The terminal C is coupled via a line 16 to a remote terminal D.

In the following description, it is assumed that the terminals A, B, and D are digital telephones, and the terminal C is a network termination between the serial data bus 10 and a digital subscriber loop constituting the line 16, the terminal D being coupled via a digital telephone exchange (not shown). Such an arrangement is known for example from "ISDN Subscriber Loop Protocol" by S. Lacher et al., International Zurich Seminar on Digital Communications, March 1982. However, the terminals need not necessarily be digital telephones, and instead may be any type of digital terminal.

In analog telephony, two telephones can be connected in parallel on the same subscriber line and can be used simultaneously, with their signals superimposed, without any problems. This manner of providing analog extension telephones can not, however, be applied to digital telephones. For example, if the terminals A and B of FIG. 1 were used simultaneously as digital extension telephones, digital signals transmitted by the two terminals A and B would corrupt one another on the upstream channel 12. Accordingly, a difficult problem arises in providing digital extension telephones.

The present invention enables this problem to be overcome expediently, as described in detail below. Furthermore, embodiments of the invention enable the same channel to be used for distribution of signals on the bus in both directions. This is illustrated in the arrangement shown in FIG. 2.

Figure 2:
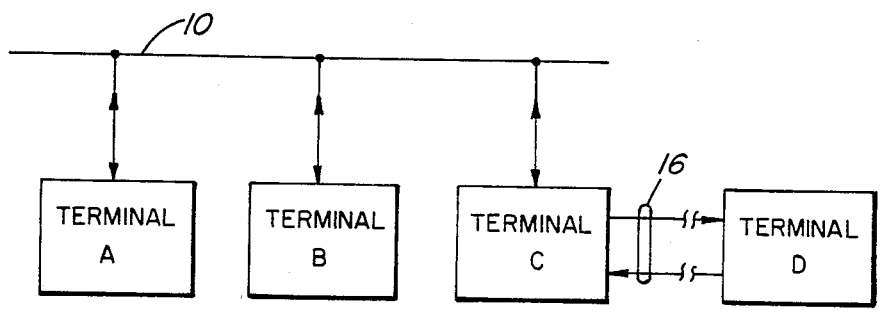

The arrangement in FIG. 2 differs from that of FIG. 1 in that all of the terminals A, B, and C are coupled in the same manner to the serial data bus 10, on which in this case the same channel is used for both transmission directions between the terminals. Thus the arrangement of FIG. 2 requires only half the bandwidth on the bus 10 of that required by the TCM arrangement of FIG. 1. The manner in which this is achieved is explained in detail below.

Not all of the terminals A to C need be provided; conversely, more than three terminals could be coupled to the bus 10. Similarly, the terminal D could be extended by a bus arrangement like that of the terminals A to C.

Figure 3:
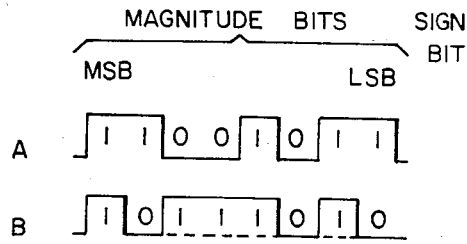
FIGS. 3 and 4 illustrate the principles of give-up and max schemes used in the arrangements of FIGS. 1 and 2 in accordance with embodiments of the invention.

The invention is based on two schemes, which are referred to herein as the "give-up" scheme and the "max" scheme. These are explained below with reference to FIGS. 3 and 4. In order to implement these schemes, each terminal transmits each byte to the bus 10, bit-serially with the magnitude bits first, in order of decreasing significance, and any sign bit last. In addition, the terminals are synchronized with one another so that corresponding bits transmitted by different terminals are transmitted at corresponding times.

The bus is arranged so that a logic "1" on the bus overrides a logic "0"; thus the bus 10 acts as a distributed wired-OR gate. Each terminal is arranged to transmit the bits of each byte to the bus regardless of the possible presence of other terminals, except that each terminal monitors the state of the bus whenever the terminal transmits a "0". If it detects a "1" on the bus during this monitoring the terminal transmits "0"s for the remainder of that particular byte; in other words, it gives up transmission of its own byte.

In consequence, if a plurality of terminals try to transmit respective bytes simultaneously to the bus, then the byte which has the maximum value remains on the bus, and each terminal which tries to transmit a byte of smaller value gives up its transmission at some point without affecting the byte on the bus.

For example, with reference to FIG. 3, suppose that the terminals A and B simultaneously wish to transmit to the bus 10 the bytes 11001011 and 10111010 respectively, the bits being in order of decreasing significance as described above and as shown in FIG. 3. During the most significant bit (MSB) time, both terminals transmit a "1" to the bus. During the next bit time, the terminal B transmits a "0" and monitors the state of the bus, whereas the terminal A transmits a "1" which prevails on the bus and is consequently seen by the terminal B. In consequence, the terminal B gives up transmitting its byte, as shown by a broken line in FIG. 3. The terminal A continues transmitting its byte, and during the "0" bits sees only "0"s on the bus because the terminal B is no longer transmitting (i.e. is transmitting zeros), so that the byte from the terminal A is transmitted on the bus. This process is repeated individually for each byte.

Figure 4:
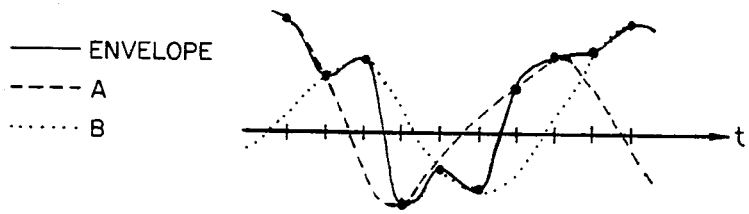

As can be seen from the above description, the maximum magnitude byte remains on the bus at all times. Referring to FIG. 4, if signals to be transmitted by the terminals A and B are represented by the dashed and dotted lines respectively, and the lines on the horizontal axis t represent sampling instants, then the successive bytes which remain on the bus are represented by the large dots and correspond to an envelope signal shown by a solid line. Thus the max scheme is implemented, each byte on the bus being the maximum of those from the terminals A and B. In other words each byte is represented by A MAX B for two transmitting terminals A and B as shown in FIG. 1, or A MAX B MAX C for three transmitting terminals as shown in FIG. 2.

Figure 5:
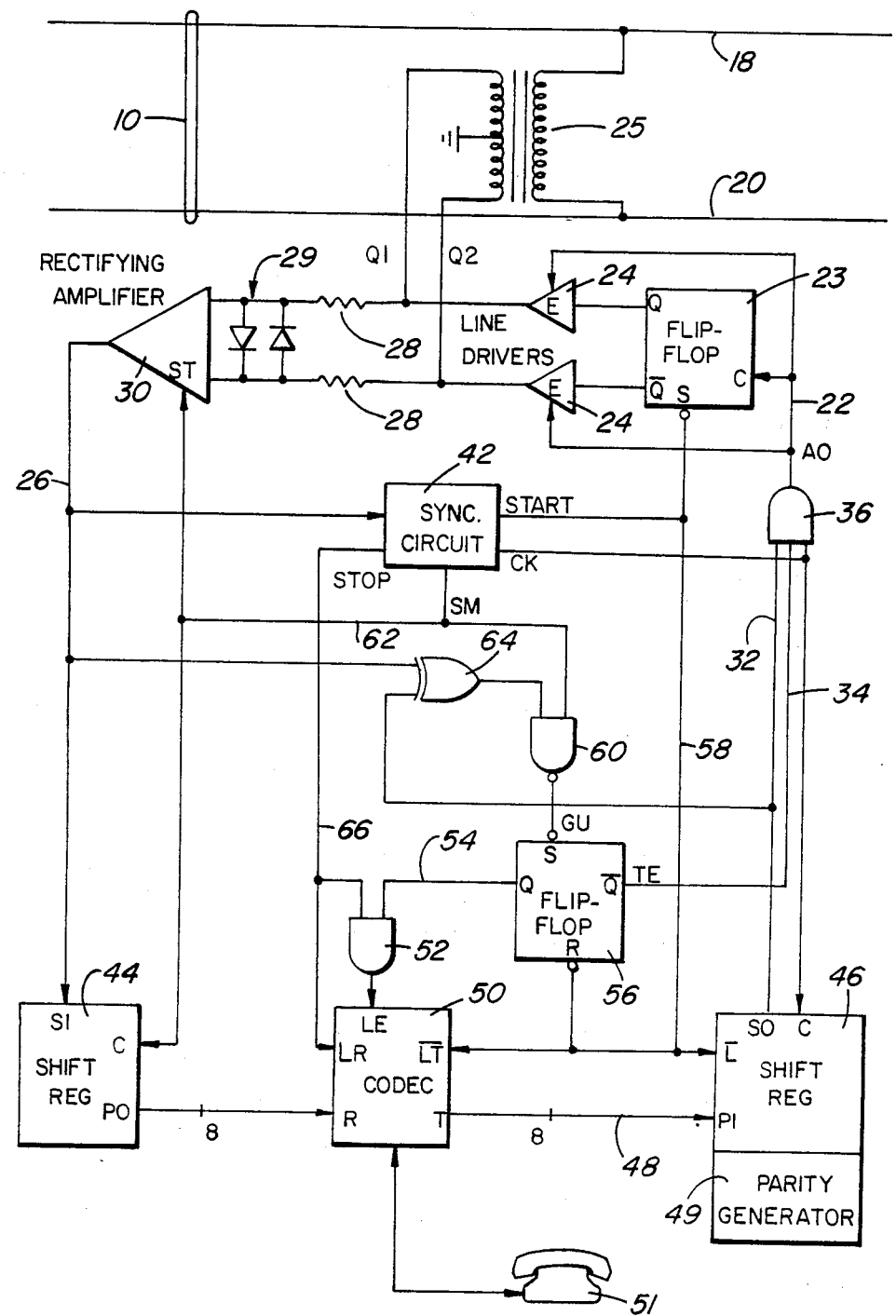
FIG. 5 is a schematic circuit diagram illustrating part of a terminal in the arrangement of FIG. 2.

FIG. 5 illustrates in detail circuitry of a terminal A, B, or C for the arrangement of FIG. 2. This circuitry is equally applicable to the terminals A and B for the arrangement of FIG. 1, except that in these terminals the receive circuitry would be separate to receive signals from the separate downstream channel 14. The terminal C in FIG. 1 does not require the give-up scheme circuitry because no other terminal competes with it for transmitting on the downstream channel 14.

Referring to FIG. 5, the bus 10 is illustrated as being in the form of a 2-wire balanced line, as is conventional for analog telephony, comprising wires 18 and 20. Signals from a transmit path 22 are coupled to the bus 10 via a J-K flip-flop 23, two line drivers 24, and a transformer 25, and signals on the bus 10 are coupled to a receive path 26 via the transformer 25, resistors 28, voltage-limiting diodes 29, and a rectifying differential amplifier 30 which converts bipolar signals on the bus 10 into rectangular unipolar pulses on the path 26. The signals on the transmit path 22 are produced from signals on a lead 32 by an AND gate 36 when a transmit enable signal TE on a lead 34 is a logic "1".

A synchronizing circuit 42 is supplied with the signals on the receive path 26 and serves in known manner to regenerate timing signals START, CK, SM, and STOP which are shown in each of FIGS. 6 and 7 and which are further described below. The signal SM is applied via a lead 62 to a strobe input ST of the amplifier 30 and to a clock input C of a shift register 44, to shift the bits of each byte on the receive path 26 into the shift register 44 via a serial input SI. The signal CK is applied to a clock input C of a shift register 46 to shift the bits of each byte to be transmitted from the shift register 46 via a serial output SO to the lead 32. A parallel input PI of the shift register 46 is coupled via 8 lines 48 to a transmit port T of a codec (coder-decoder) 50, which has a receive port R coupled to an 8-bit parallel output PO of the shift register 44. The sign bit connections between the ports T and R of the codec 50 and the respective shift registers 44 and 46 are "crossed over" the magnitude bit connections to relate the desired bit order in the shift registers (sign bit last) correctly to that required by the codec 50. The codec 50 is coupled for example to a telephone dial pad and handset 51 to constitute a digital telephone.

The signal START produced by the synchronizing circuit 42 is supplied via a lead 58 to load inputs $\overline{L}$ of the shift register 46 and $\overline{LT}$ of the codec 50, to cause an 8-bit byte to be transmitted to be loaded from the codec 50 into the shift register 46 in response to the signal START becoming a logic "0". A parity generator 49 associated with the shift register generates a ninth, parity, bit to produce in the shift register 46 a 9-bit byte which has an even number of logic "1"s. As explained further below, this ensures that d.c. balance of the bus 10 is maintained. The 8 non-parity bits of a 9-bit byte received via the receive path 26 and shifted into the shift register 44 are loaded into the codec 50 in response to the signal STOP, produced by the synchronizing circuit 42 and supplied via a lead 66 to a load input LR of the codec 50, becoming a logic "1", provided that a signal applied to a load enable input LE of the codec 50 by an AND gate 52 is also a logic "1". The AND gate 52 is also supplied with the signal STOP from the lead 66 and controlled by a signal on a lead 54, which signal is complementary to the transmit enable signal TE on the lead 34.

The leads 34 and 54 are connected to the outputs $\overline{Q}$ and Q, respectively, of a flip-flop 56, whose state is controlled by the signal STOP supplied to a reset input R from the lead 58, and by a give-up signal GU produced by a NAND gate 60 and applied to a set input S. The gate 60 has two inputs, to one of which is supplied the signal SM from the lead 62 and to the other of which is applied the output of an exclusive-OR gate 64 whose inputs are connected to the receive path 26 and the lead 32.

As illustrated in FIG. 5, the signal CK is also supplied to an input of the AND gate 36, the output signal AO of which is supplied via the transmit path 22 to a clock input C of the flip-flop 23 and to enable inputs E of the line drivers 24. The signal START on the lead 58 is also supplied to a set input S of the flip-flop 23, the outputs and Q $\overline{Q}$ of which are connected to inputs of the line drivers 24 which produce drive signals Q1 and Q2 to drive the bus 10 via the transformer 25.

The gates 60 and 64 and the flip-flop 56 serve to control the gates 36 and 52 in such a manner that if a particular byte being transmitted from the shift register 46 is not exceeded in magnitude by another byte simultaneously applied to the bus 10 from another terminal connected thereto, then the signal TE is a logic "1" so that this particular byte is fully transmitted but no byte is received by the codec 50 because the gate 52 is not enabled. Conversely, if the particular byte being transmitted is exceeded in magnitude by a byte simultaneously applied to the bus 10 by another terminal, then the signal TE becomes a logic "0 to inhibit the gate 36 to give up the transmission of the byte, and the gate 52 is enabled to allow the maximum aagnitude byte on the bus to be received by the codec 50.

Thus the codec receives only those bytes on the bus 10 which it has not transmitted, and the bytes transmitted by the codec 50 only prevail on the bus 10, to enable them to be received by other terminals connected to the bus, if they are not exceeded in magnitude by simultaneous bytes transmitted by such other terminals. This alternative full transmission or reception of bytes in a particular terminal, which is further described below with reference to FIGS. 6 and 7, enables the same channel to be used for both directions of transmission on the bus 10, with the bandwidth-saving advantage already mentioned.

Figure 6:
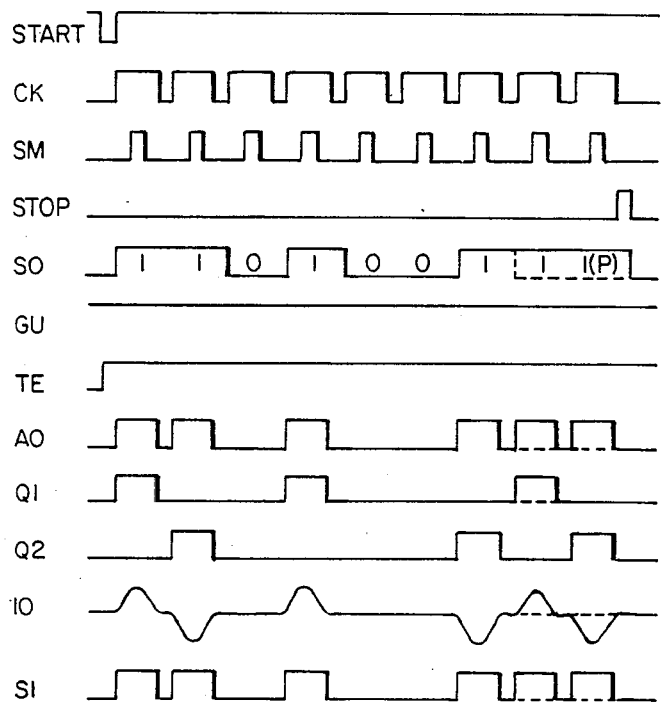
FIGS. 6 and 7 are timing diagrams illustrating operation of the circuit of FIG. 5.
Figure 7:
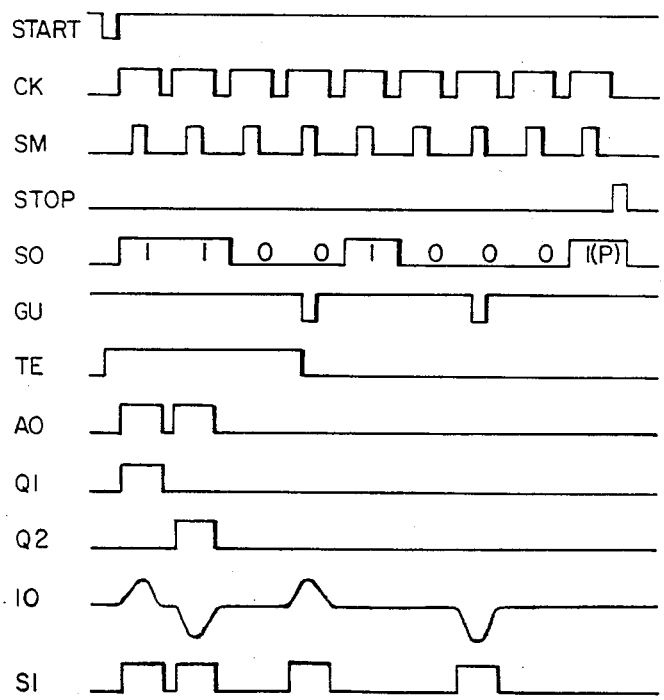

Each of FIGS. 6 and 7 illustrates the signals START, CK, SM, and STOP produced by the synchronizing circuit 42, a serial output signal SO produced on the lead 32 by the shift register 46, the give-up signal GU produced by the gate 60, the transmit enable signal TE produced on the lead 34, the signal AO produced by the gate 36, the signals QI and Q2 produced by the line drivers 24, a bipolar or alternate-mark-inversion (AMI) signal present on the bus 10, and the consequent serial input signal SI produced by the amplifier 30 on the receive path 26 and applied to the serial input of the shift register 44. FIG. 6 illustrates the case of full transmission of a byte to the bus 10, and consequently no reception of this byte by the codec 50, and FIG. 7 illustrates the case in which give-up of the transmission of a byte to the bus 10 occurs, with consequent reception by the codec 50 of a greater magnitude byte prevailing on the bus 10.

Referring to FIG. 6, for each byte each of the signals CK and SM comprises a sequence of 9 pulses. On each rising edge (0-to-1 transition) of the signal CK a bit is clocked out of the shift register 46 to the lead 32, and on each falling edge (1-to-0 transition) of the signal SM a bit is clocked from the receive path 26 into the shift register 44. Prior to the pulses the signal START=0 occurs on the lead 58, in response to which a byte for transmission is loaded from the codec 50 into the shift register 46, the flip-flop 56 is reset to produce the signal TE=1 on the lead 34 to enable the gate 36 for such transmission, and correspondingly to disable the gate 52 via the lead 54, and the flip-flop 23 is set to ensure that the first logic "1" bit of the byte for transmission is represented by a positive AMI pulse on the bus 10.

In FIG. 6 it is assumed that the byte 11010011 is loaded from the codec 50 into the shift register 46 for transmission, and that no greater magnitude byte occurs on the bus 10 simultaneously to cause transmission of this byte to be given up. Consequently with the final, parity, bit the shift register 46 contains the 9-bit byte 110100111, as shown in solid lines in FIG. 6 for the signal SO. For each logic 1 of this byte, with the signal TE=1 the gate 36 produces a pulse of the signal AO, the falling edges (1-to-0 transitions) of which pulses toggle the flip-flop 23 to produce alternate logic "1" pulses of the drive signals Q1 and Q2 as shown in FIG. 6. The characteristics of the transformer 25 and its coupling to the bus 10 are selected in known manner to cause the drive signals Q1 and Q2 to produce on the bus 10 the resultant AMI waveform shown in FIG. 6. When not enabled, the drivers 23 have high output impedances, so that during each "0" bit of the byte the amplifier 30 can properly monitor any signals on the bus 10. The resultant amplified and rectified signal SI on the receive path 26 has the waveform shown in FIG. 6.

The exclusive-OR gate 64 produces a logic 1 output whenever the signals SO for transmission and SI on the receive path differ from one another. If such a difference occurs during a sampling time in the middle of a bit duration, when the signal SM=1 enables the gate 60, then the gate 60 produces a logic 0 (signal GU) output to set the flip-flop 56 to give up transmission and enable reception of a byte. As illustrated in FIG. 6, this does not occur, so that the byte is fully transmitted, and reception of this same byte by the codec 50 is prevented. as is desired.

The 8-bit byte 11010011 loaded from the codec 50 into the shift register 46 for transmission as illustrated in FIG. 6 has an odd number of logic 1 bits. The parity bit added by the parity generator 49 provides an even number of logic 1 bits in the transmitted 9-bit byte, so that there are equal numbers of positive and negative pulses on the bus 10, whereby the balanced state of the bus 10 is maintained. In order to avoid cancellation of logic 1 bits from different terminals, which would occur on the bus 10 if two different terminals simultaneously transmitted logic 1 bits with opposite polarity pulses, each terminal is arranged to transmit the first logic 1 bit of each byte as a positive pulse on the bus 10, as shown in FIG. 6. This is achieved by the initial setting of the flip-flop 23 by the signal START as described above.

Thus the transmission of the additional, even parity, bit ensures that the bus 10 does not become unbalanced. Furthermore, the transmission of the first logic 1 bit of each byte always with the same polarity (positive as described here, but it could alternatively be negative) avoids cancellation of pulses from different terminals without requiring each terminal to monitor the state of the bus continuously. Such monitoring would result in undesired complexity of the terminals and prevent their portability, which is undesirable for the case of remote-powered terminals, such as digital telephones.

If, instead of being as described above, the 8-bit byte loaded into the shift register 46 from the codec 50 contained an even number of logic 1 bits, then the parity bit would be a logic 0. Tnis is illustrated by the broken lines in FIG. 6, for transmission of the 8-bit byte 11010010, illustrating that again in this case the balanced condition of the bus 10 is maintained.

Referring now to FIG. 7, it is assumed that the 8-bit byte 11001000 is loaded from the codec 50 into the shift register 46 for transmission as a 9-bit even parity byte 110010001, and that the greater magnitude 9-bit even parity byte 110100100 is simultaneously applied to the bus 10 from another terminal. The first three bits of these bytes are the same, so that transmission occurs as described with reference to Fig. 6. The fourth bits are different. Thus during the fourth bit duration, with the signal SM=1 on the lead 62, the exclusive-OR gate 64 produces a logic 1 output and the give-up signal GU=0 is produced to set the flip-flop 56. This also happens during the seventh bit duration, when it has no effect because the flip-flop 56 is already set.

As a result of the setting of the flip-flop 56, the signal TE=0 is produced for the remainder of the byte, so that the gate 36 is inhibited and the signal AO remains a logic 0. Consequently transmission of the lower-magnitude byte is given up. In addition, via the lead 54 the 9ate 52 is enabled so that with the signal STOP=1 at the end of the byte the 8 non-parity bits of the 9-bit received byte 110100100 prevailing on the bus 10 are loaded into the codec 50 from the shift register 44.

Although particular embodiments of the invention have been described in detail, it should be appreciated that numerous modifications, variations, and adaptations may be made thereto without departing from the scope of the invention, which is defined by the claims.

In particular, for example, it is observed that the bus may comprise an optical fiber, instead of being an electrical line as described above, and the means in each terminal for applying pulses to the bus may comprise means for applying optical pulses to the bus. In such an arrangement the additional, parity, bit of each byte described above may be omitted, and the optical pulses may be unipolar, because there is no need to maintain a balanced condition of an optical bus. The bus would in this case have to be appropriately arranged, with optical reflectors and/or splitters, to convey the optical pulses in both directions on the bus between arbitrary terminals coupled thereto.

What is claimed is:

1. A terminal for transmitting data bytes of a digital data signal on a serial data bus, the terminal comprising:
   first means for providing each data byte for transmission bit-serially with magnitude bits first, in order of decreasing significance, and any sign bit following the magnituce bits;
   second means for applying a predetermined signal to the bus in response to each serial bit having a first binary value; and
   third means for inhibiting the application of said predetermined signal to the bus by the second means, for the remaining serial bits of the current data byte, in response to said predetermined signal occurring on the bus during a serial bit having a second binary value, whereby each data byte is transmitted to the bus only if its magnitude is not less than that of any data byte simultaneously on the bus.

2. A terminal as claimed in claim 1 wherein the third means comprises receiving means for receiving said predetermined signal from the bus and producing a corresponding bit stream, means for comparing bits of the bit stream with the serial bits of each data byte provided by the first means, and means for inhibiting the second means for the remainder of the current data byte if the compared bits have different binary values.

3. A terminal as claimed in claim 2 wherein the means for inhibiting the second means comprises a bistable stage having an output coupled to the second means, the bistable stage being responsive to said means for comparing bits determining that the compared bits have different binary values to adopt a state in which the second means is inhibited, and means for setting the bistable stage to a state in which the second means is not inhibited at the start of each data byte for transmission.

4. A terminal as claimed in claim 2 and including means, responsive to said bit stream and to the means for inhibiting the second means, for receiving from the bus bytes during which the second means has been inhibited.

5. A terminal as claimed in claim 1 and including means, responsive to the third means, for receiving from the bus bytes during which the application of said predeterminded signal to the bus by the second means has been inhibited.

6. A terminal as claimed in claim 5 wherein the first means and the means for receiving bytes together comprise shift register means and a coder-decoder.

7. A terminal as claimed in claim 6 wherein the terminal is a telephone.

8. A terminal as claimed in claim 1 wherein the first means includes means for providing each data byte for transmission with a final parity bit so that each data byte has even parity.

9. A terminal as claimed in claim 8 wherein the second means comprises means for applying a pulse to the bus in response to each serial bit which is a binary one, successive pulses having opposite polarities and the first pulse of each byte having a predetermined polarity.

10. A terminal as claimed in claim 9 wherein the terminal is a telephone.

11. Apparatus comprising a serial data bus and at least two terminals coupled thereto each for transmitting data bytes of a digital data signal thereon, each terminal comprising:

first means for providing each data byte for transmission bit-serially with magnitude bits first, in order of decreasing significance, and any sign bit following the magnitude bits;

second means for applying a pulse to the bus in response to each serial bit which is a binary one;

third means for inhibiting the application of pulses to the bus by the second means, for the remainder of the current data byte, in response to a pulse occurring on the bus during a serial bit which is a binary zero; and means for synchronizing the first means so that the terminals transmit data bytes simultaneously and in synchronism;

whereby only the greatest magnitude data byte, of data bytes for simultaneous transmission from a plurality of the terminal is fully transmitted to the bus.

12. Apparatus as claimed in claim 11 wherein each terminal further comprises receiving means, responsive to the third means, for receiving from the bus data bytes which have not been transmitted by that terminal.

13. Apparatus as claimed in claim 12 wherein the third means comprises means for enabling the second means and inhibiting the receiving means at the start of each data byte, and for inhibiting the second means and enabling the receiving means in response to a pulse occurring on the bus during a binary zero serial bit provided by the first means.

14. Apparatus as claimed in claim 12 wherein the bus comprises a balanced two-wire line and the second means of each terminal applies pulses to the bus with alternating polarity.

15. Apparatus as claimed in claim 14 wherein, for each terminal, the first means includes means for providing each data byte for transmission with a final parity bit so that each byte has even parity, and the second means is arranged to apply the first pulse of each data byte to the bus with a predetermined polarity.

16. Apparatus as claimed in claim 11 wherein at least one terminal is a telephone.

17. Apparatus as claimed in claim 12 wherein at least one terminal is a telephone.

18. Apparatus as claimed in claim 15 wherein at least one terminal is a telephone.

19. Apparatus as claimed in claim 12 wherein the bus comprises an optical fiber and the second means of each terminal comprises means for applying optical pulses to the bus.

20. A method of transmitting data bytes on a serial data bus having terminals coupled thereto, comprising the steps of:

synchronizing the terminals to transmit data bytes simultaneously and in synchronism; and, in each terminal:

providing each data byte for transmission bit-serially with the bits in order of decreasing significance;

applying a pulse to the bus in response to each serial bit of one binary value;

detecting any pulse on the bus during each serial bit of another binary value; and inhibiting the application of said pulse for the remaining serial bits of the current data byte in response to such detection;

whereby the most significant data byte of the simultaneous data bytes prevails on the bus.

21. A method as claimed in claim 20 and including the step of, in each terminal, receiving from the bus each data byte which has not been transmitted by that terminal.

22. A method as claimed in claim 21 wherein the bus is a balanced line, the pulses are applied to the bus with alternating polarity, the first pulse of each data byte from each terminal having the same polarity, and each data byte includes a final, even parity, bit to maintain the balance of said line.

* * * * *